US012747574B2

(12) United States Patent
Maguire et al.

(10) Patent No.: US 12,747,574 B2
(45) Date of Patent: Sep. 29, 2026

(54) 3-DIMENSIONAL PRINTED STRUCTURE AND A SYSTEM AND METHOD FOR THE 3-DIMENSIONAL PRINTING OF STRUCTURES

(71) Applicant: Azure Printed Homes, Inc., Gardena, CA (US)

(72) Inventors: Ross Maguire, Hawthorne, CA (US); Gene Eidelman, Los Angeles, CA (US)

(73) Assignee: Azure Printed Homes, Inc., Culver City, CA (US)

( * ) Notice: Subject to any disclaimer, the term of this patent is extended or adjusted under 35 U.S.C. 154(b) by 330 days.

(21) Appl. No.: 18/127,859

(22) Filed: Mar. 29, 2023

(65) Prior Publication Data

US 2023/0313520 A1 Oct. 5, 2023

Related U.S. Application Data

(60) Provisional application No. 63/325,488, filed on Mar. 30, 2022.

(51) Int. Cl.
*E04B 1/16* (2006.01)
*B29C 64/118* (2017.01)
(Continued)

(52) U.S. Cl.
CPC .............. *E04B 1/16* (2013.01); *B29C 64/118* (2017.08); *B29C 64/232* (2017.08);
(Continued)

(58) Field of Classification Search
CPC ....... E04B 1/16; B29C 64/118; B29C 64/232; B29C 64/236; B32B 3/30; B32B 9/045;
(Continued)

(56) References Cited

U.S. PATENT DOCUMENTS 8,974,213 B1 * 3/2015 Yakubov ................ B33Y 30/00 425/375
2017/0058509 A1 * 3/2017 Babin ..................... E04B 1/355
(Continued)

FOREIGN PATENT DOCUMENTS

WO WO-2007086737 A1 * 8/2007 ............. B32B 13/08
WO WO-2017191404 A1 * 11/2017 ............. B28B 1/001

OTHER PUBLICATIONS

Search Report and Written Opinion for PCT/US2023/016697 (9 pages). (Year: 2023).*

(Continued)

*Primary Examiner* — Donald M Flores, Jr.
(74) *Attorney, Agent, or Firm* — JD Harriman; Foundation Law Group LLP

(57) ABSTRACT

A 3-dimensional printed structure, and a system and method for the 3-dimensional printing of structures is disclosed, including a structure comprising a plurality of sides comprising the following: a bottom, a top, a left wall and a right wall each constructed using a 3D printing process. The structure is 3D printed by initially printing a continuous rear end surface associated with each of the bottom, the top, the left wall and the right wall and thereafter the 3D printing process additively depositing material in a continuous bead to build up the initially deposited material to further construct the bottom, the top, the left wall and the right wall to complete the 3-D printing of the structure. The 3-D printing process finally deposits the material to form a monolithic and continuous front end surface associated with each of the bottom, the top, the left wall, and the right wall.

11 Claims, 4 Drawing Sheets

(51) Int. Cl.

| | |
|---|---|
| ***B29C 64/232*** | (2017.01) |
| ***B29C 64/236*** | (2017.01) |
| ***B32B 3/30*** | (2006.01) |
| ***B32B 9/04*** | (2006.01) |
| ***B32B 27/06*** | (2006.01) |
| ***B33Y 10/00*** | (2015.01) |
| ***B33Y 80/00*** | (2015.01) |
| ***E04G 21/02*** | (2006.01) |
| *B29K 105/26* | (2006.01) |

(52) U.S. Cl.

CPC .............. *B29C 64/236* (2017.08); *B32B 3/30* (2013.01); *B32B 9/045* (2013.01); *B32B 27/06* (2013.01); *B33Y 10/00* (2014.12); *B33Y 80/00* (2014.12); *E04G 21/02* (2013.01); *B29K 2105/26* (2013.01); *B32B 2255/10* (2013.01); *Y10T 428/1352* (2015.01); *Y10T 428/139* (2015.01); *Y10T 428/1393* (2015.01); *Y10T 428/24* (2015.01)

(58) Field of Classification Search

CPC ..... B32B 27/06; B32B 2255/10; B33Y 10/00; B33Y 80/00; E04G 21/02; B29K 2105/26; Y10T 428/1352; Y10T 428/139; Y10T 428/1393; Y10T 428/24

See application file for complete search history.

(56) References Cited

U.S. PATENT DOCUMENTS

| | | | | |
|---|---|---|---|---|
| 2020/0256051 | A1* | 8/2020 | Becerril Hernández . | E04B 1/18 |
| 2021/0055710 | A1* | 2/2021 | Borish ............... | G05B 19/4099 |
| 2021/0277648 | A1* | 9/2021 | Dubov .................... | E04C 2/365 |
| 2022/0072733 | A1* | 3/2022 | Wu ........................... | E04B 1/16 |
| 2023/0193617 | A1* | 6/2023 | Dubov ...................... | E04C 2/20 264/494 |

OTHER PUBLICATIONS

Furet et al. (WO 2017/191404 A1); Nov. 9, 2017 (EPO machine translation to English). (Year: 2017).*

Eric Dellolio; “Is Concrete Soundproof?”; Second Skin Auto & Home Insulations, Aug. 6, 2024; <https://www.secondskinaudio.com/soundproofing/is-concrete-soundproof/?srsltid=AfmBOoo5wlxfNrbpFOGLu1QO5001IzU2OYMbEVRmLfa2MQf1fM0zkfVZ>. (Year: 2024).*

* cited by examiner

3-DIMENSIONAL PRINTED STRUCTURE AND A SYSTEM AND METHOD FOR THE 3-DIMENSIONAL PRINTING OF STRUCTURES

CROSS REFERENCE TO RELATED PATENT(S) AND APPLICATION(S)

This application claims the benefit of U.S. Provisional Application No. 63/325,488, filed Mar. 30, 2022, and entitled SYSTEM AND METHOD FOR THE 3-DIMENSIONAL PRINTING OF STRUCTURES, which is hereby incorporated in its entirety by reference.

BACKGROUND

This disclosure, and the exemplary embodiments described herein, describe methods and systems for 3-dimensional printing technologies and more specifically to the 3-dimensional printing of structures. However, it is to be understood that the scope of this disclosure is not limited to such application.

3-dimensional (3D) printing, or additive manufacturing, is the construction of a 3D object from a computer-aided design (CAD) or another 3D model. 3D printing may apply to various processes wherein material is deposited, joined, or solidified under computer control to create the 3D object. In general, 3D printable models are created using CAD programs, via a 3D scanner, or using photogrammetry software. Once a suitable file type (such as an STL file) is generated, the file is processed by a slice which converts the models into a series of thin layers. These layers become individual steps in the additive manufacturing printing process.

Traditionally, 3D printing used polymers for printing. However, methods have been developed which allow for the utilization of metals, ceramics, and other materials. The primary differences between the various known processes are in the way layers are deposited and in the materials that are used. 3D printing has many applications in the manufacturing and medical industries.

BRIEF DESCRIPTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

Embodiments described herein relate to a 3D-printed structure, including a structure comprising a plurality of sides including: a bottom, a top, a left side and a right side, each constructed using a 3D printing process. According to an exemplary embodiment of this disclosure, the structure is monolithically 3D printed by an additive process which results in a structure resting on a platform and oriented with the top as the most upper surface. The completed structure is then rotated onto the bottom external surface to provide a properly oriented structure. A front side/wall and rear side/wall, which are not 3D printed, are constructed and/or added using various construction techniques which attach the front and rear sides to the 3D printed structure. Some of the features associated with the front and rear sides may include, but are not limited to, windows, doors, electrical fixtures, etc.

The embodiments disclosed, and variants thereof, provide an efficient and cost-effective means of producing a habitable structure using, in some embodiments, recycled polymers, i.e. recycled plastic. The structure can be 3D-printed at a remote location and shipped to the consumer while reducing the amount of on-site fabrication, preparation, and labor.

In accordance with one exemplary embodiment of the present disclosure, disclosed is a 3D-printed structure comprising: a structure comprising a plurality of sides including a bottom, a top, a left wall and a right wall each constructed using a 3D printing process, wherein the 3D printing process additively deposits material in a continuous bead to generate the plurality of sides by 1) initially depositing the material to form a monolithic and continuous rear end surface associated with each of the bottom, the top, the left wall and the right wall and thereafter 2) the 3D printing process additively depositing material in a continuous bead to build up the initially deposited material to further construct the bottom, the top, the left wall and the right wall to complete the 3-D printing of the structure, the 3-D printing process finally depositing the material to form a monolithic and continuous front end surface associated with each of the bottom, the top, the left wall and the right wall, wherein the 3-D printed structure is rotated to rest on the bottom upon completion of the 3D printing process.

In accordance with another exemplary embodiment of the present disclosure, disclosed is a method of constructing a 3D-printed structure including a plurality of sides including a bottom, a top, a left wall and a right wall, the method comprising: a 3D printing process additively depositing material in a continuous bead to generate the plurality of sides by 1) initially depositing the material to form a monolithic and continuous rear end surface associated with each of the bottom, the top, the left wall and the right wall, and thereafter 2) the 3D printing process additively depositing material in a continuous bead to build up the initially deposited material to further construct the bottom, the top, the left wall and the right wall to complete the 3-D printing of the structure, the 3-D printing process finally depositing the material to form a monolithic and continuous front end surface associated with each of the bottom, the top, the left wall and the right wall, wherein the 3-D printed structure is rotated to rest on the bottom upon completion of the 3D printing process.

In accordance with another exemplary embodiment of the present disclosure, disclosed is A six sided enclosed habitable structure comprising: a 3-D printed structure including a plurality of sides including a bottom, a top, a left wall and a right wall each constructed using a 3D printing process, wherein the 3D printing process additively deposits material in a continuous bead to generate the plurality of sides by 1) initially depositing the material to form a monolithic and continuous rear end surface associated with each of the bottom, the top, the left wall and the right wall and thereafter 2) the 3D printing process additively depositing material in a continuous bead to build up the initially deposited material to further construct the bottom, the top, the left wall and the right wall to complete the 3-D printing of the structure, the 3-D printing process finally depositing the material to form a monolithic and continuous front end surface associated with each of the bottom, the top, the left wall and the right wall, wherein the 3-D printed structure is rotated to rest on the bottom upon completion of the 3D printing process; and a front wall and a rear wall added to the 3D-printed structure after completion of the 3D-printing process, the front wall and rear wall operatively attached to the 3-D printed structure and the front wall and rear wall enclosing the 3-D printed structure.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
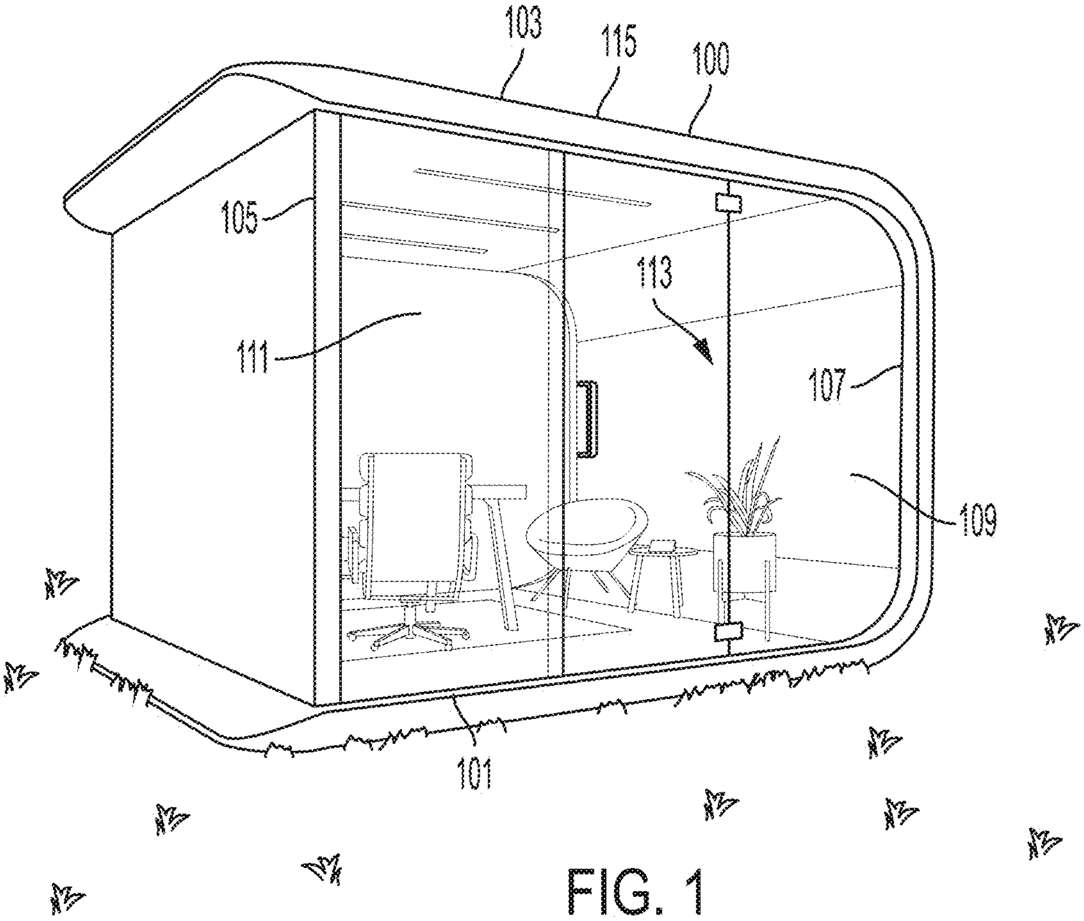
FIG. 1 illustrates a perspective view of an enclosed habitable structure including a 3D-printed structure according to an exemplary embodiment of this disclosure, the 3D-printed structure.

This disclosure and exemplary embodiments described herein provide method and systems for generating a 3D-printed structure, the structure comprising a plurality of sides including: a bottom, a top, a left side and a right side, each constructed using a 3D printing process. According to an exemplary embodiment of this disclosure, the structure is monolithically 3D printed by an additive process which results in a 4 sided structure resting on a platform and oriented with the top side as the most upper surface. The completed structure is then rotated onto the bottom external surface to provide a properly oriented structure. A front side/wall and rear side/wall, which are not 3D printed, are constructed and/or added using various construction techniques which attach the front and rear sides to the 3D printed structure. Some of the features associated with the front and rear sides may include, but are not limited to, windows, doors, electrical fixtures, etc.

The specific details of the single embodiment or variety of embodiments described herein are set forth in this application. Any specific details of the embodiments are used for demonstration purposes only, and no unnecessary limitation or inferences are to be understood therefrom.

Before describing in detail exemplary embodiments, it is noted that the embodiments reside primarily in combinations of components related to the system. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a process for the 3-Dimensional (3D) printing of a structure. The structure is designed to be occupiable and/or habitable by at least one person and may include thermal insulation, and the ability for the inclusion of building utilities, while creating a means for interior and exterior customization. The structure is constructed of a 3D-printable material such as a polymer and/or recycled polymer and is printed on its side such that the structure is printed in a single monolithic print, thus reducing the time needed for production and simplifying the manufacturing process.

In some embodiments, the deposited material is comprised of recycled plastic or a glycol-modified polyethylene terephthalate (PETG) and is glass fiber filled.

With reference to FIG. 1, shown is an enclosed habitable structure including a 3D-printed structure according to an exemplary embodiment of this disclosure, the 3D-printed structure. The enclosed habitable structure 100 includes a bottom 101, top 103, left wall 105 and right wall 107. A front side/wall/window 109 and a rear side/wall/window 111 are added after the completion of the 3D-printing of the bottom 101, top 103, left wall 105 and right wall 107 as described herein. In the illustrated embodiments, the bottom 101, top 103, left wall 105, and right wall 107 are 3D printed and form a self-supporting structure. Each surface of the bottom 101, top 103, left wall 105 and right wall 107 (collectively referred to as sidewall(s)) is capable of receiving a decorative finish, such as dry wall, paneling, etc., to allow the consumer to customize the appearance of the interior surface 113 or exterior surface 115 of the structure 100.

Figure 2:
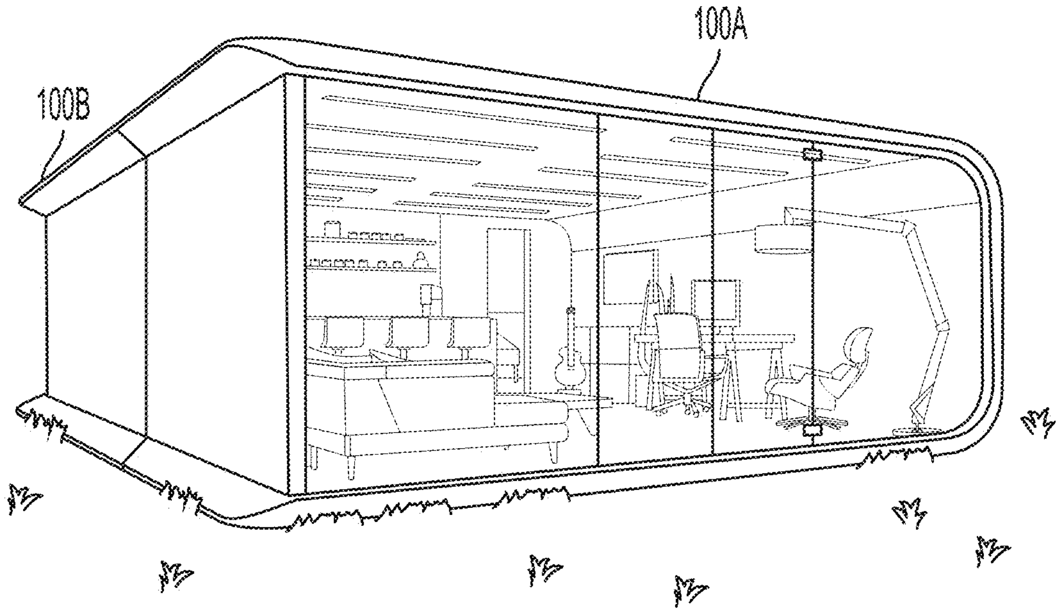
FIG. 2 illustrates a perspective view of another enclosed habitable structure including a 2 3D-printed structures according to an exemplary embodiment of this disclosure, this structure including 2 3D-printed modules attached to enlarge the overall size of the enclosed habitable structure.

With reference to FIG. 2, illustrate another, second exemplary embodiment of an enclosed habitable structure including a 3D-printed structure, wherein the habitable structure 100 in FIG. 2 is larger than the habitable structure 100 in FIG. 1. This relatively enlarged and enclosed habitable structure includes two modular enclosed habitable structures 100 which are joined. Each habitable structure 100 includes a bottom 101, top 103, left wall 105 and right wall 107. The front habitable structure 100A includes a front side/wall/window 109 and front habitable structure 1008 includes a rear side/wall/window 111 which are added after the completion of the 3D-printing of the bottom 101, top 103, left wall 105 and right wall 107 as described herein. Each surface of the bottom 101, top 103, left wall 105 and right wall 107 is capable of receiving a decorative finish, such as dry wall, paneling, etc., to allow the consumer to customize the appearance of the interior surface 113 or exterior surface 115 of the structure 100.

In some embodiments, the front wall 109 and rear wall 111 may be constructed of a transparent material and are not 3D printed. Alternatively, the front wall 109 and rear wall 111 may be constructed of a combination of materials including, but not limited to, cement board, wood framing, drywall, paneling, widow(s), door(s), etc.

The 3D printing process is performed such that the structure 100 is 3D printed on its side. In such, the rear wall 111 or front wall 109 is positioned as the base (see FIG. 3). Once the 3D printing process is complete, the 3D-printed structure is 100 is rotated such that the bottom 101 becomes the base of the structure 100. In addition, once the 3D printing process is completed, the structure 100 undergoes various prefabrication and other processes. These prefabrication processes may include installing doors, windows, internal MEP, insulation, flooring, wall finishing, ceiling cladding, and the application of protective exterior finishing.

Prior to delivery, the structures foundation and utilities may be completed. The foundation ensures the structure has a suitable base to be positioned on, while utilities ensure the structure is habitable.

One skilled in the arts will readily understand that the size, dimensions, shape, and features of the structure may be modified without deterring from the embodiments described herein.

Figure 3:
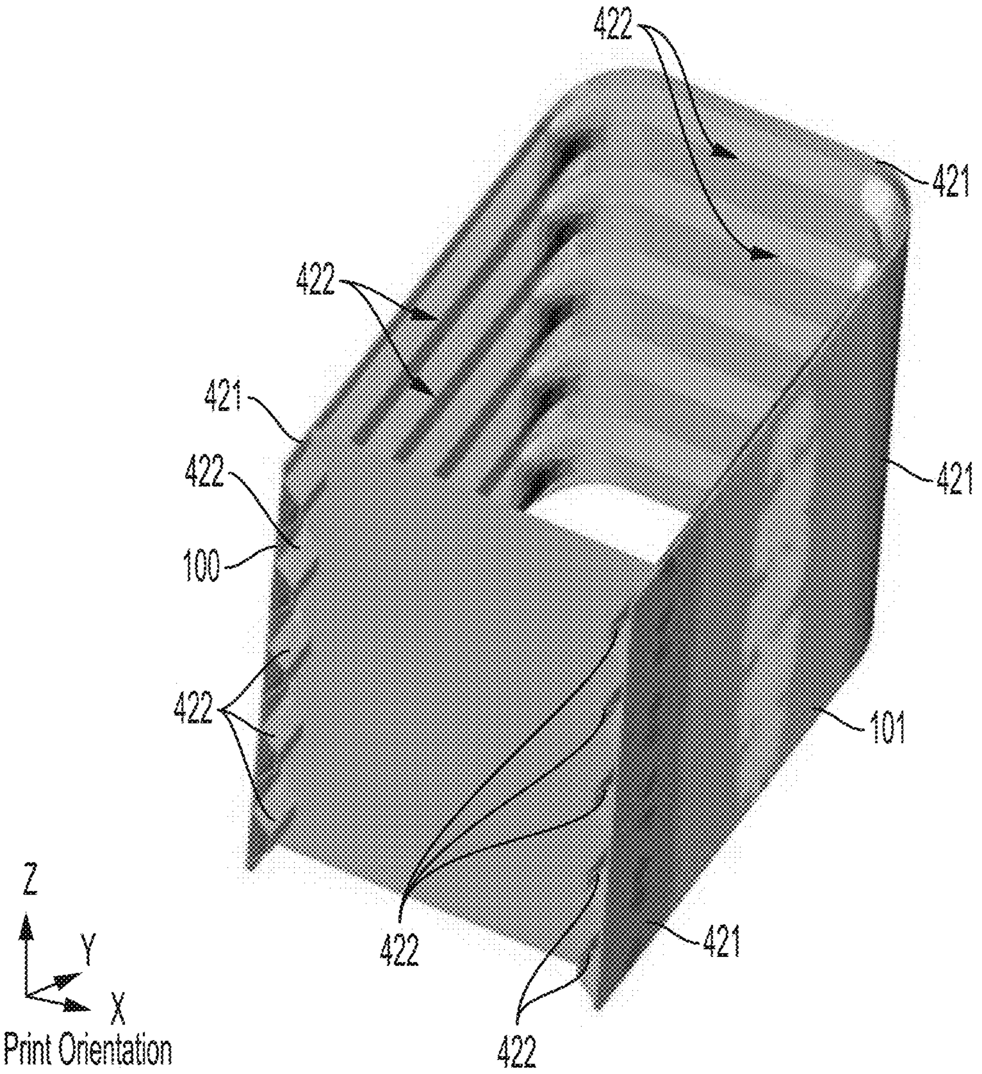
FIG. 3 illustrates a perspective view of a completed 3D-printed structure during a 3D printing process, according to an exemplary embodiment of this disclosure.
Figure 4:
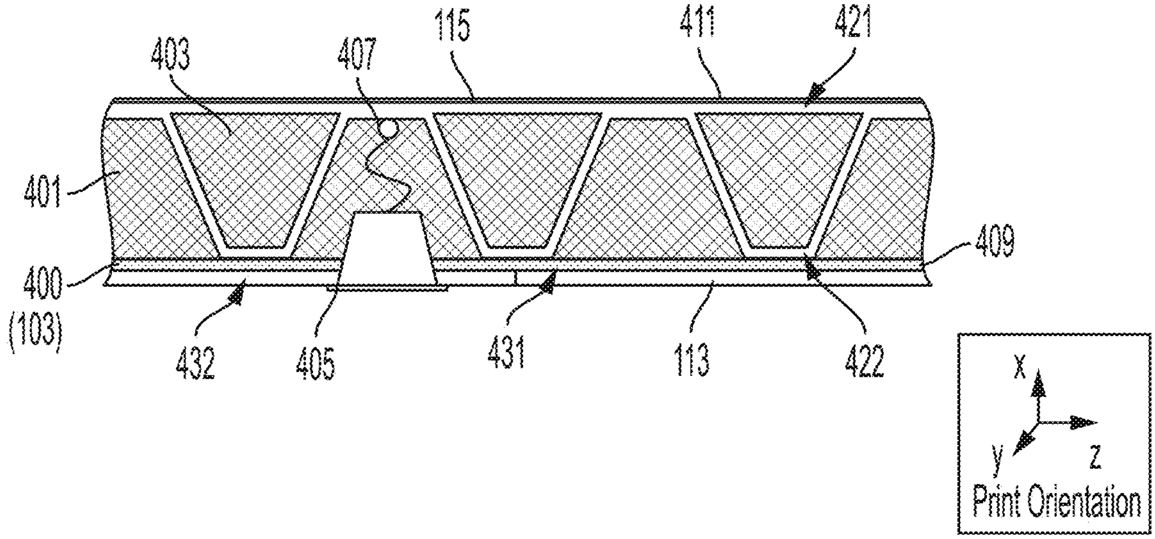
FIG. 4 illustrates a cross-section of the sidewall of the 3D-printed structure, according to an exemplary embodiment of this disclosure.

With reference to FIG. 3, illustrated is another perspective view of a completed 3D-printed structure during a 3D printing process, according to an exemplary embodiment of this disclosure, and FIG. 4 illustrates a cross-section of a top/bottom/sidewall 400 of the structure. While the cross-section shown specifically shows the details of a top portion of the 3-D printed structure, the cross-section details are associated with all sides (top/bottom/left/right) of the 3D-printed structure.

As shown, during the 3D-printing process, a continuous exterior print bead 421 and a continuous interior print bead 422 are deposited to form the structure. Furthermore, continuous interior print bead 422 is printed to generate a plurality of channels extending between the continuous exterior print bead 421 and the continuous interior print bead 422. The cavities 403 resulting from these channels provide space for insulation, wire routing, plumbing, etc. In addition, as shown, the interior face of the continuous interior bead 422 is relatively linear/flat to provide an anchoring surface for wall/ceiling/floor substrate attachment 431, as well as other interior wall/ceiling/floor covering material 432.

When completed, the sides 400 include an interior surface 113 and an exterior surface 115. The interior 401 space between the interior surface 113 and an exterior surface 115 includes insulation 403. One or more light assemblies 405 and electrical wiring 407 are positioned such that the light assemblies 405 protrude through the interior surface 113 and substrate 409 thereof. The exterior surface 115 may include an ultraviolet light (UV) protective layer 411.

Various details of the disclosed 3-dimensional printed structure and system and method for the 3-dimensional printing of structures are now provided.

According to an exemplary embodiment of this disclosure, a 3D-printed structure and associated printing system and method includes a structure comprising a plurality of sides including a bottom, a top, a left wall and a right wall each constructed using a 3D printing process. The 3D printing process additively deposits material in a continuous bead to generate the plurality of sides by 1) initially depositing the material to form a monolithic and continuous rear end surface associated with each of the bottom, the top, the left wall and the right wall, and thereafter
2) the 3D printing process additively depositing material in a continuous bead to build up the initially deposited material to further construct the bottom, the top, the left wall and the right wall to complete the 3-D printing of the structure, the 3-D printing process finally depositing the material to form a monolithic and continuous front end surface associated with each of the bottom, the top, the left wall and the right wall, wherein the 3-D printed structure is rotated to rest on the bottom upon completion of the 3D printing process.

According to an exemplary embodiment, the deposited material is recycled plastic and the 3D-printing process includes the use of a 3-axis robotic arm operatively associated with the positioning of an extruder to additively deposit the material.

According to another exemplary embodiment, the 3D-printing process includes the use of an anchored 3-axis robotic arm operatively associated with the positioning of an extruder to additively deposit the material, and a rotating platform to position the 3-D printed structure for additively depositing the material.

According to another exemplary embodiment, the 3-D-printed structure includes a continuous exterior print bead and a continuous interior print bead, and the continuous interior print bead is printed to generate a plurality of channels extending between the continuous exterior print bead and the continuous interior print bead.

According to another exemplary embodiment, a front wall and a rear wall are independently added to the 3D-printed structure after completion of the 3D-printing process, the front wall and rear wall operatively attached to the 3-D printed structure and the front wall and rear wall enclosing the 3-D printed structure.

According to another exemplary embodiment, the plurality of sides are 3D-printed as a complete monolithic structure.

According to another exemplary embodiment, each of the plurality of sides includes an interior surface and an exterior surface, and the interior surface and the exterior surface are separated by insulation.

According to another exemplary embodiment, the interior surface includes at least one of the following: a wall covering, a flooring, a wall finishing, and a ceiling cladding.

According to another exemplary embodiment, the exterior surface includes a UV protective layer.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A 3D-printed structure, comprising:

a structure comprising a plurality of sides including a bottom, a top, a left wall and a right wall each constructed using a 3D printing process, wherein the 3D printing process additively deposits polymer material in a continuous bead to generate the plurality of sides by 1) initially depositing the polymer material to form a monolithic and continuous rear end surface associated with each of the bottom, the top, the left wall and the right wall and thereafter 2) the 3D printing process additively depositing the polymer material in the continuous bead to build up the initially deposited polymer material to further construct the bottom, the top, the left wall and the right wall to complete the 3-D printing of the structure, the 3-D printing process finally depositing the polymer material to form a monolithic and continuous front end surface associated with each of the bottom, the top, the left wall and the right wall, wherein the 3-D printed structure is rotated to rest on the bottom upon completion of the 3D printing process;

wherein the continuous bead of the 3-D-printed structure includes a continuous exterior print bead and a continuous interior print bead, wherein the continuous exterior print bead defines an exterior surface of each of the plurality of sides, wherein the continuous interior print bead defines an interior surface of each of the plurality of sides, wherein the continuous exterior print bead and the continuous interior print bead cooperatively define a plurality of cavities within each of the plurality of sides, the plurality of cavities extending between the exterior surface and the interior surface, wherein the continuous interior print bead includes a plurality of bead segments extending inwardly toward the continuous exterior print bead, the plurality of bead segments defining the plurality of cavities extending between the continuous exterior print bead and the continuous interior print bead.

2. The 3D-printed structure according to claim 1, wherein the polymer material is recycled plastic and the 3D-printing process includes the use of a 3-axis robotic arm operatively associated with the positioning of an extruder to additively deposit the material.

3. The 3D-printed structure according to claim 1, wherein the 3D-printing process includes the use of an anchored 3-axis robotic arm operatively associated with the positioning of an extruder to additively deposit the polymer material, and a rotating platform to position the 3-D printed structure for additively depositing the material.

4. The 3D-printed structure according to claim 1, wherein a front wall and a rear wall are independently added to the 3D-printed structure after completion of the 3D-printing process, the front wall and rear wall operatively attached to the 3-D printed structure and the front wall and rear wall enclosing the 3-D printed structure.

5. The 3D-printed structure according to claim 1, wherein the plurality of sides are 3D-printed as a complete monolithic structure.

6. The 3D-printed structure according to claim 1, wherein each of the plurality of sides includes the interior surface and the exterior surface, and the interior surface and the exterior surface are separated by insulation.

7. The 3D-printed structure according to claim 6, wherein the interior surface includes at least one of the following: a wall covering, a flooring, a wall finishing, and a ceiling cladding.

8. The 3D-printed structure according to claim 6, wherein the exterior surface includes a UV protective layer.

9. The 3D-printed structure according to claim 1, wherein the polymer material is comprised of one or more of a recycled plastic, and a glycol-modified polyethylene terephthalate (PETG), and is glass fiber filled.

10. A 3D-printed structure, comprising:

a structure comprising a plurality of sides including a bottom, a top, a left wall and a right wall each constructed using a 3D printing process, wherein the 3D printing process additively deposits polymer material in a continuous bead to generate the plurality of sides by 1) initially depositing the polymer material to form a monolithic and continuous rear end surface associated with each of the bottom, the top, the left wall and the right wall and thereafter 2) the 3D printing process additively depositing the polymer material in the continuous bead to build up the initially deposited polymer material to further construct the bottom, the top, the left wall and the right wall to complete the 3-D printing of the structure, the 3-D printing process finally depositing the polymer material to form a monolithic and continuous front end surface associated with each of the bottom, the top, the left wall and the right wall, wherein the 3-D printed structure is rotated to rest on the bottom upon completion of the 3D printing process, wherein the continuous bead of the 3-D-printed structure includes a continuous exterior print bead and a continuous interior print bead, wherein the continuous exterior print bead defines an exterior surface of each of the plurality of sides, wherein the continuous interior print bead defines an interior surface of each of the plurality of sides, wherein the continuous interior print bead includes a plurality of inwardly extending bead segments, wherein adjacent inwardly extending bead segments cooperating with the continuous exterior print bead define the plurality of cavities extending between the continuous exterior print bead and the continuous interior print bead.

11. The 3D-printed structure according to claim 10, wherein the polymer material is comprised of one or more of a recycled plastic, and a glycol-modified polyethylene terephthalate (PETG), and is glass fiber filled.

* * * * *